United States Patent
Nelson et al.

(10) Patent No.: US 7,580,916 B2
(45) Date of Patent: Aug. 25, 2009

(54) ADJUSTMENTS TO RELATIONAL CHART OF ACCOUNTS

(75) Inventors: Kimberly Nelson, Fargo, ND (US); Brett Lindemann, Fargo, ND (US); Ronald Schulz, West Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 392 days.

(21) Appl. No.: 11/079,999

(22) Filed: Mar. 15, 2005

(65) Prior Publication Data

US 2006/0224473 A1    Oct. 5, 2006

(51) Int. Cl.
*G06F 17/30* (2006.01)
(52) U.S. Cl. ............................................. 707/1; 707/10
(58) Field of Classification Search ...................... 707/1, 707/10
See application file for complete search history.

(56) References Cited

U.S. PATENT DOCUMENTS

| | | | | |
|---|---|---|---|---|
| 5,745,755 A | * | 4/1998 | Covey | 707/203 |
| 5,970,476 A | * | 10/1999 | Fahey | 705/28 |
| 6,088,693 A | * | 7/2000 | Van Huben et al. | 707/8 |
| 6,182,121 B1 | * | 1/2001 | Wlaschin | 709/215 |
| 6,397,221 B1 | * | 5/2002 | Greef et al. | 707/102 |
| 6,601,057 B1 | * | 7/2003 | Underwood et al. | 707/1 |
| 6,754,666 B1 | * | 6/2004 | Brookler et al. | 707/102 |
| 2001/0051948 A1 | * | 12/2001 | Srinivasan et al. | 707/102 |
| 2003/0236768 A1 | * | 12/2003 | Sribhibhadh et al. | 707/1 |
| 2004/0015470 A1 | * | 1/2004 | Smith et al. | 707/1 |
| 2004/0015473 A1 | * | 1/2004 | Trappen et al. | 707/1 |
| 2004/0133552 A1 | * | 7/2004 | Greenfield et al. | 707/1 |
| 2004/0167869 A1 | * | 8/2004 | Barnard et al. | 707/1 |
| 2004/0167870 A1 | * | 8/2004 | Wakefield et al. | 707/1 |
| 2004/0243539 A1 | * | 12/2004 | Skurtovich et al. | 707/1 |
| 2005/0038772 A1 | * | 2/2005 | Colrain | 707/1 |
| 2005/0055324 A1 | * | 3/2005 | Godeby et al. | 707/1 |

* cited by examiner

*Primary Examiner*—Wilson Lee
*Assistant Examiner*—Kim T Nguyen
(74) *Attorney, Agent, or Firm*—Westman, Champlin & Kelly, P.A.

(57) ABSTRACT

A computer-readable medium and a computer implemented method to enable a computer to provide a relational chart of accounts with an underlying data support scheme that allows for an undetermined number of dimensions to be used with an account. Dimensions can be added or removed without having to perform a re-implementation of the relational chart of accounts.

14 Claims, 5 Drawing Sheets

| GL ID | DIM. CODE | DIM. VALUE | ACCT. | $ | | |
|---|---|---|---|---|---|---|
| 3834 | 01 | USA | 1010 | 37.00 | | |
| 3834 | 02 | KANSAS | 1010 | 37.00 | | |
| 3834 | 03 | 33 | 1010 | 37.00 | | |
| 3834 | 04 | 1000 | 1010 | 37.00 | | |
| | | | | | | |
| | | | | | | |

| 301 → | 302 → | 303 → | 304 → | 305 → | 306 → | 307 → |
|---|---|---|---|---|---|---|
| COUNTRY | STATE | REGION | STORE | ACCOUNT | $ | GL ID |
| USA | KANSAS | 1000 | 33 | 1010 | 37.00 | 3834 |

| NAME | CODE | | |
|---|---|---|---|
| COUNTRY | 01 | | |
| STATE | 02 | | |
| STORE | 03 | | |
| REGION | 04 | | |
| | | | |

FIG. 4

| GL ID | DIM. CODE | DIM. VALUE | ACCT. | $ | | |
|---|---|---|---|---|---|---|
| 3834 | 01 | USA | 1010 | 37.00 | | |
| 3834 | 02 | KANSAS | 1010 | 37.00 | | |
| 3834 | 03 | 33 | 1010 | 37.00 | | |
| 3834 | 04 | 1000 | 1010 | 37.00 | | |
| | | | | | | |

ADJUSTMENTS TO RELATIONAL CHART OF ACCOUNTS

BACKGROUND OF THE INVENTION

The present invention generally pertains to software applications that facilitate the tracking of corporate finances. More specifically, the present invention pertains to a relational chart of accounts with support for providing an efficient and effective response to an addition, elimination or inactivation of a dimension.

Most corporate accounting software, including most Enterprise Resource Planning (ERP) software applications, is configured to support conformance with some level of standardized accounting practices. Many solutions include a chart of accounts. Generally speaking, a chart of accounts is a listing of accounts associated with a general ledger. Different types of businesses will have different accounts. Each account typically includes some sort of identifier such as a reference number.

Certain systems support the use of dimensions to attribute characteristics to recorded information. For example, some systems support an association of a posted transaction with one or more dimensions (e.g., a responsible department or region) in addition to an account number. Some systems incorporate at least one dimension for all entries to the general ledger. Typically, dimensions are utilized as a customized basis to support any of a variety of analytical functions such as reporting or budgeting.

Some systems will include a relational chart of accounts that lists each general ledger account with zero or more dimensions. At least because relationships within business organizations can be ever changing and complex to conceive, it becomes desirable to configure a system to support the assignment of dimensions in a way that they can grow and change as the underlying business grows and changes. A system should at least support the efficient and effective addition of a new dimension, or modification to an existing dimension or inactivation of an existing dimension.

For many known accounting systems, once the determination of the chart of accounts is set, it is neither simple nor efficient to effectuate a change. Some systems even require a complete re-implementation of the chart of accounts thereby requiring execution of a separate program specially customized for such a task. In many cases, a dimension cannot be added, removed or inactivated without sacrificing the ability to manipulate financial data based on the dimension configuration prior to the adjustment.

SUMMARY OF THE INVENTION

A computer-readable medium and a computer implemented method to enable a computer to provide a relational chart of accounts with an underlying data support scheme that allows for an undetermined number of dimensions to be used with an account. Dimensions can be added or removed without having to perform a re-implementation of the relational chart of accounts.

DETAILED DESCRIPTION OF ILLUSTRATIVE EMBODIMENTS

Embodiments of the present invention pertain to a chart of accounts that will enable a modification of a dimension configuration without execution of any specialized program designed for such a task. The chart of accounts allows for a user to use any combination of dimensions with a given account and provides complete flexibility to make adjustments. The integrity of the underlying financial data will be maintained even if new dimensions are added, or if existing dimensions are no longer used or if existing dimensions are inactivated. Prior to describing embodiments of the present invention in detail, a suitable computing system environment in which the embodiments may be implemented will be described.

Figure 1:
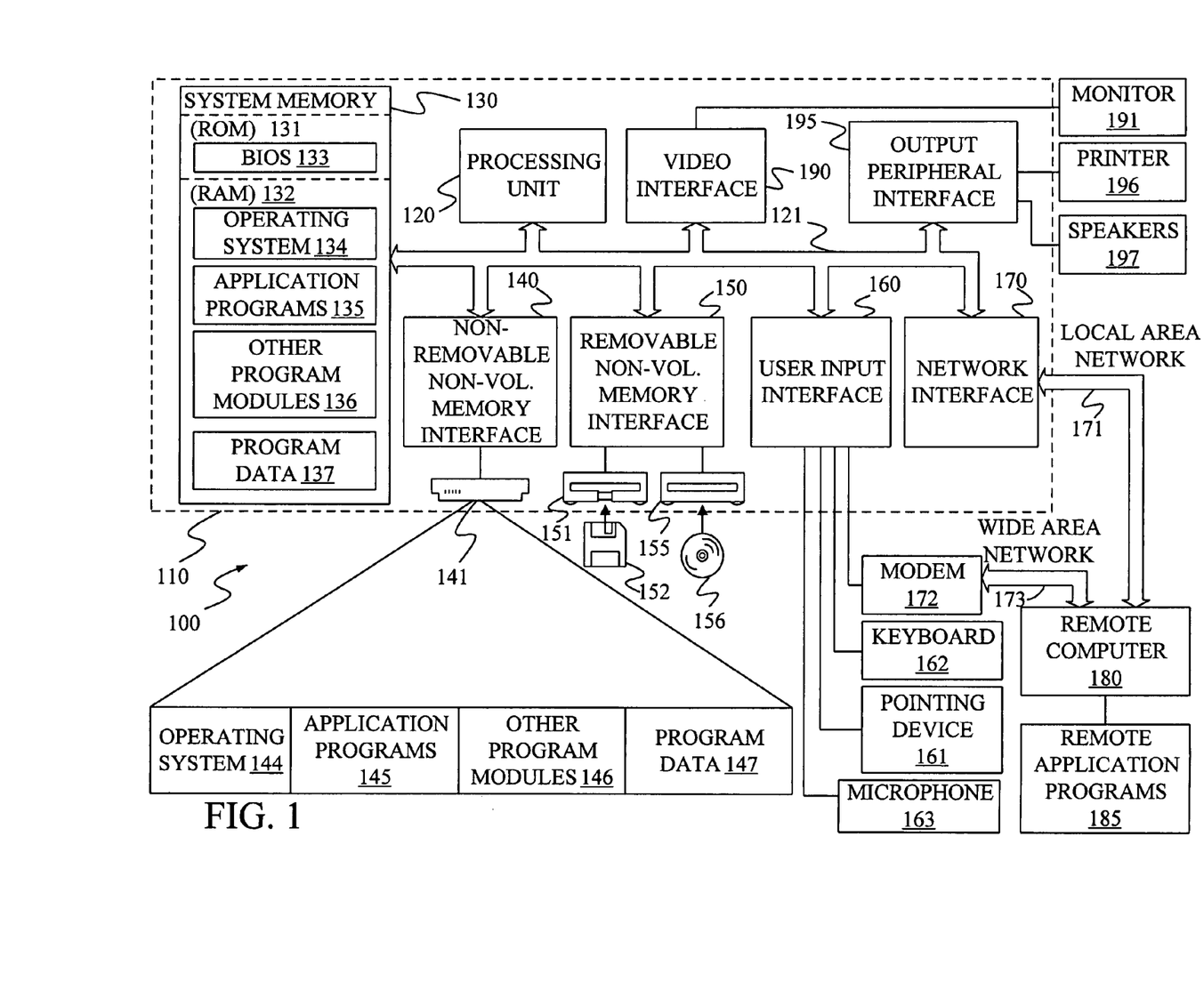
FIG. 1 is a block diagram of a computing environment in which embodiments of the present invention may be implemented.

FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purposes or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media may be any available media that may be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components may either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
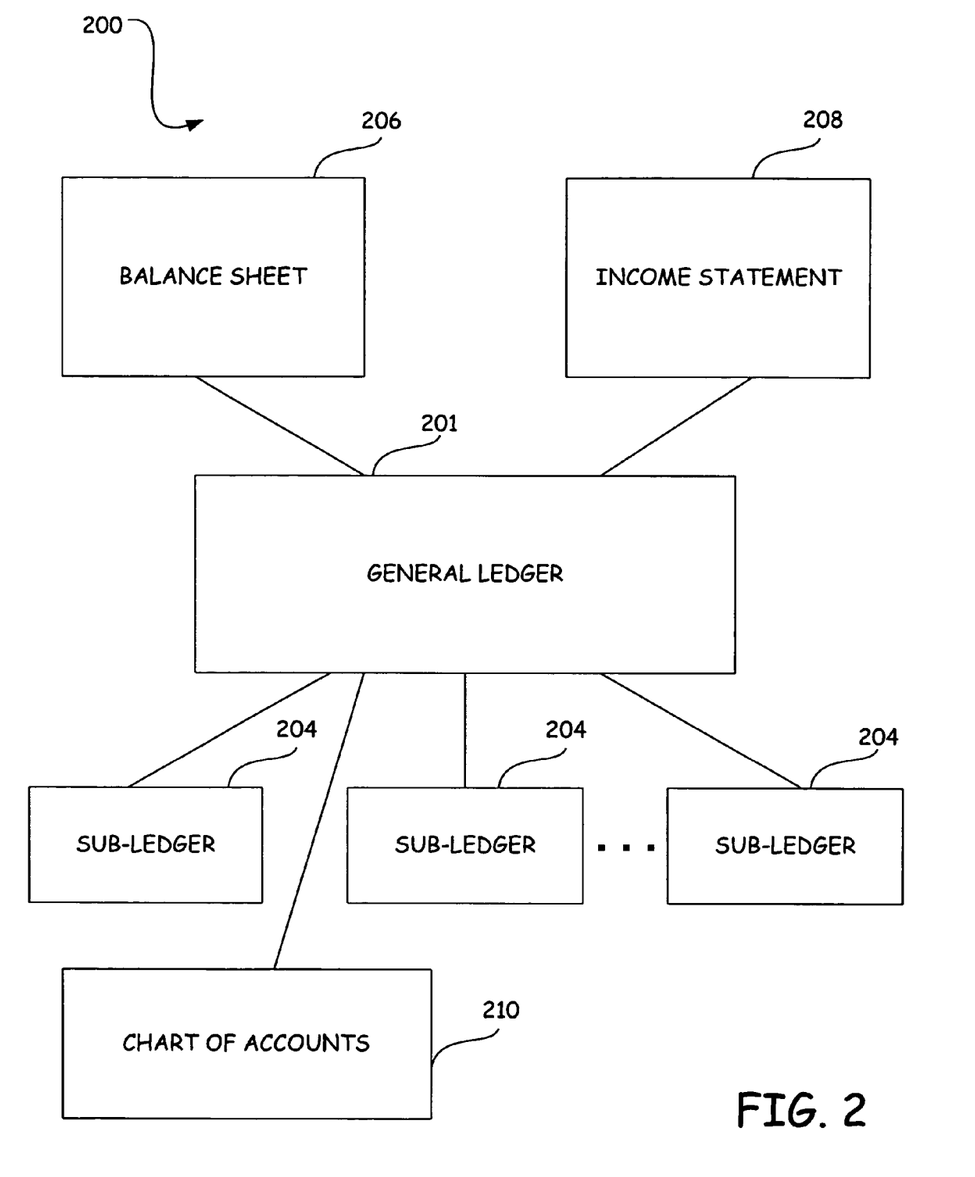
FIG. 2 is schematic block diagram of a simplified financial record system.

Before proceeding to a description of illustrative embodiments, one context in which embodiments of the present invention may be implemented will be described. In that regard, FIG. 2 is a schematic block diagram of a simplified financial record system 200. The core of system 200 is general ledger 201. All financial transactions flow through general ledger 201 so as to support the creation of a permanent financial history. System 200 also includes a plurality of sub-ledgers 204 that track specific items such as cash, accounts receivable, accounts payable, payroll, inventory and the like. All financial entries posted to sub-ledgers 204 will transact through general ledger 201. For example, when a customer pays off a bill with cash, the transaction will be posted to the general ledger as well as the two appropriate sub-ledgers 204 (i.e., cash and accounts receivable).

Balance sheet 206 and income statement (sometimes referred to as a "profit and loss" statement) 208 are financial documents that are drawn directly from general ledger 201. More specifically, general ledger 201 will contain the balances that make up line items on reports 206 and 208. Balance sheet 206 is typically configured to provide an overview of financial condition at a given point in time such as at the close of an accounting period. In contrast, income statement 208 provides a profit/loss summary during a predetermined period of time, such as a month, quarter or one-year.

System 200 also includes a relational chart of accounts 210 which includes a listing of accounts associated with general ledger 201. In accordance with one aspect of the present invention, chart of accounts 210 is relational in that it includes zero or more dimensions associated with each account. In one embodiment, some accounts may be listed in multiple instances with different dimension combinations.

It is common for system 200 to be implemented in the specific context of a software application. It should be noted that, for the purpose of illustrating basic components, system 200 is very simply presented. When actually applied in the context of a real-world business, the structure of such a system may become quite complex, particularly when applied in the context of a large company having a sophisticated enterprise-oriented organization scheme.

Figure 3:
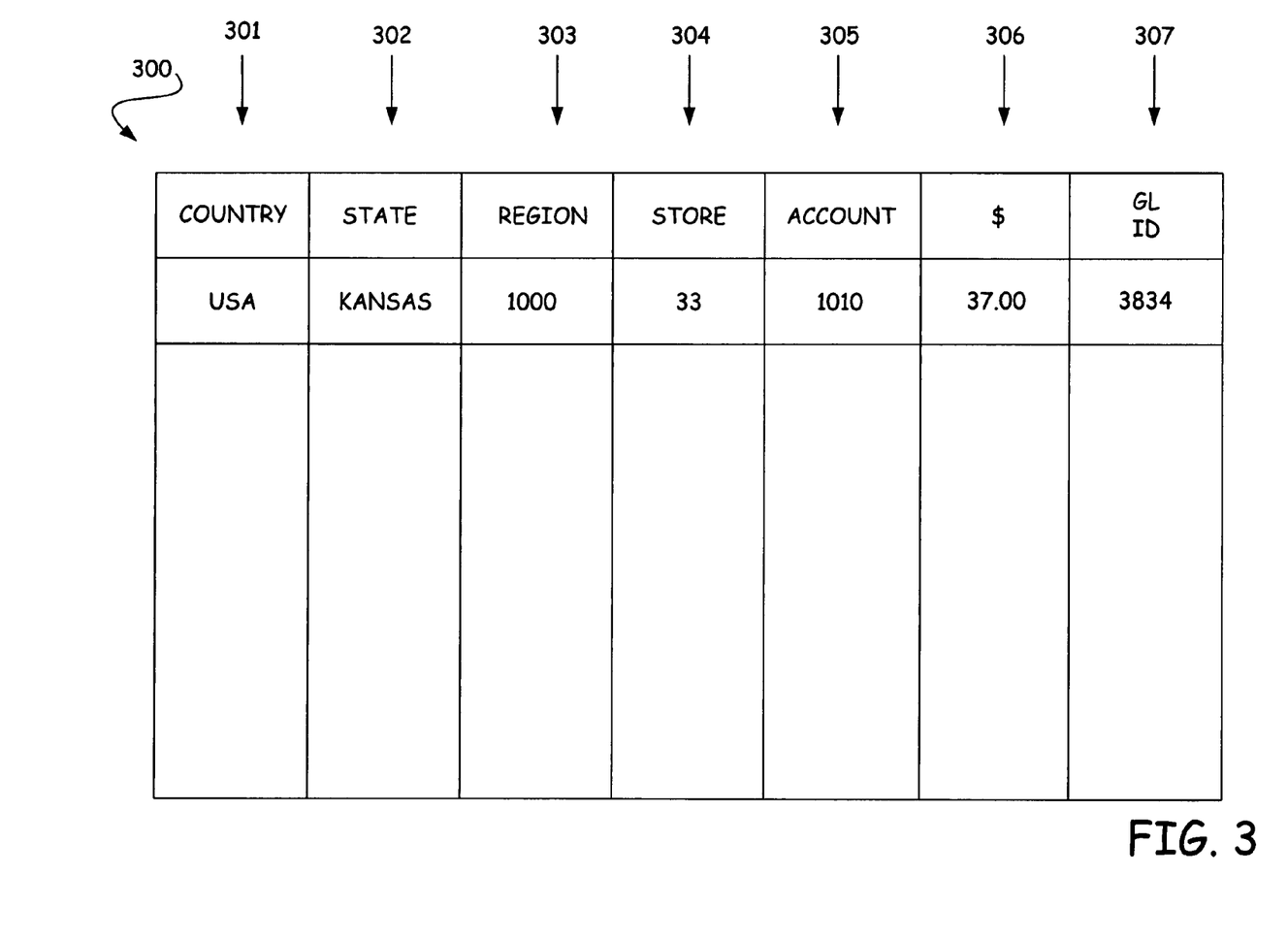
FIG. 3 is a representation of a table demonstrating one manner in which dimension-oriented data is accessibly stored.

FIG. 3 is a representation of a table 300 demonstrating one manner in which dimension-oriented data underlying a relational chart of accounts can be accessibly stored in a computer database. More specifically, chart 300 represents a plurality of database entries for one particular entry posted to the general ledger. Each of columns 301-307 represent a different characteristic of the transaction. It should be noted that an actual implementation could include fewer or additional columns (e.g., a column for the transaction date, etc.).

Columns 301, 302, 303 and 304 each represent a different dimension associated with the underlying transaction. Column 301 represents a COUNTRY dimension that has been assigned a value of USA. Column 302 represents a STATE dimension that has been assigned a value of KANSAS. Column 303 represents a REGION dimension that has been assigned a value of 1000. Column 304 represents a STORE dimension that has been assigned a value of 33. Column 305 includes an applicable account number, column 306 includes applicable information pertaining to the dollar amount of the transaction, and column 307 contains a general ledger journal entry number that corresponds to the transaction.

A negative characteristic associated with the described scheme for storing dimension-oriented data is that once the determination of the chart of accounts is set, it can be relatively difficult to make any adjustments. To make such adjustments, many accounting systems require a re-implementation of the chart of accounts, thereby requiring execution of a specialized program configured for such a task. One rationale underlying the challenges faced by many known systems in altering the configuration of the various dimensions being tracked is that database storage columns must be added, deleted or inactivated to support such modifications.

One aspect of the present invention pertains to a relational chart of accounts that supports dimension-oriented changes without requiring execution of any specialized programs. In one embodiment, the relational chart of accounts of the present invention is configured to enable a user to use any combination of dimensions with their accounts and provides complete flexibility to change. If a user needs to change which dimensions to track with the accounts, new dimensions can be defined and added to the relational structure, or existing dimensions can be removed from the structure or inactivated.

In one embodiment, the integrity of the underlying financial data will be maintained when new dimensions are added or existing dimensions are no longer used or inactivated. For example, if a dimension that had been entered on previous transactions is later determined to be no longer needed by the user, the transactions that incorporated this dimension would still be affiliated with this dimension even when the dimension is eliminated for subsequent transactions. The deleted dimension could still, for the historically applicable transactions, be subsequently exploited (e.g., for historic analysis).

In accordance with one embodiment, a user is provided with an ability to add additional dimensions at any time, even if transactions already exist for the company. For example, after entering and posting transactions for several months, a user determines that they would also like to track a CITY dimension in the general ledger. The user can simply create the dimension CITY and then moving forward transact against this new dimension. The new dimension would illustratively only affect future transactions. In one embodiment, the new dimension can be added to historical transactions.

In accordance with one aspect of the present invention, the described flexibility to configure and re-configure dimensions is supported in the underlying data storage scheme. A specialized data definition is implemented to enable an undetermined number of dimensions to be used with an account. In accordance with one embodiment, the system supports an ability to persist the different combinations used based on the dimensions used and not on the number of dimensions defined. This enables maximum flexibility without requiring physical data storage modifications as dimension usage changes. While there are numerous ways to actually implement a specialized data definition as described, one example will now be provided to demonstrate the general concept.

Figure 4:
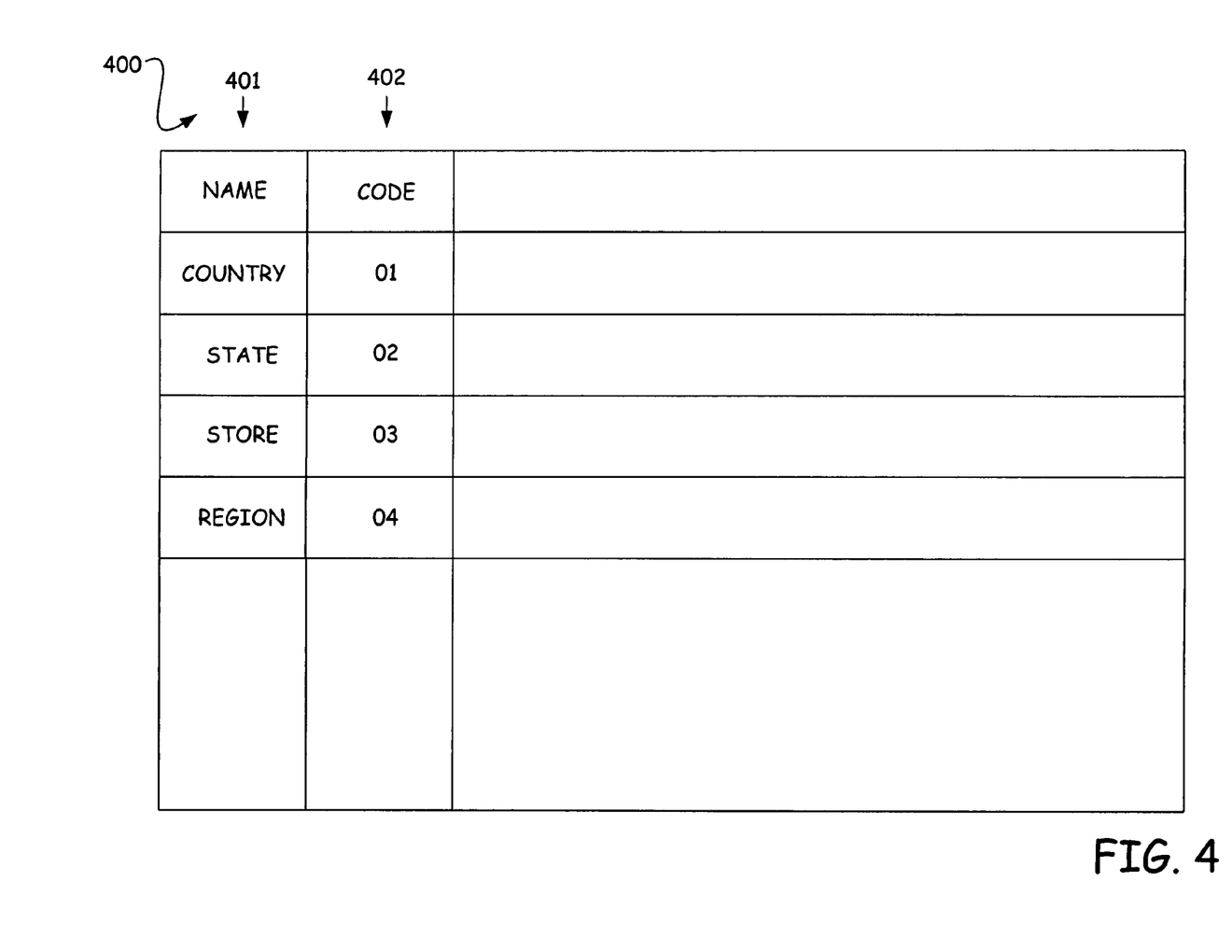
FIG. 4 is a representation of a table of dimensions.

FIG. 4, in accordance with one embodiment of the present invention, is a table of dimensions 400, which represents a portion of a specialized data definition scheme. Each row of table 400 illustratively represents a dimension. Column 401 illustratively contains the name or type of each dimension. Column 402 illustratively contains a numerical representation (i.e., a code) for each dimension. It should be noted that additional columns can be included to support other attributes for each dimension. In accordance with one embodiment, when a user adds a dimension (e.g., add a dimension to the relational chart of accounts), a new corresponding row is simply added to table 400. Similarly, if a user eliminates a dimension, the corresponding row is simply eliminated from the table. In one embodiment, if a dimension is inactivated, a corresponding designation is noted in table 400.

Figure 5:
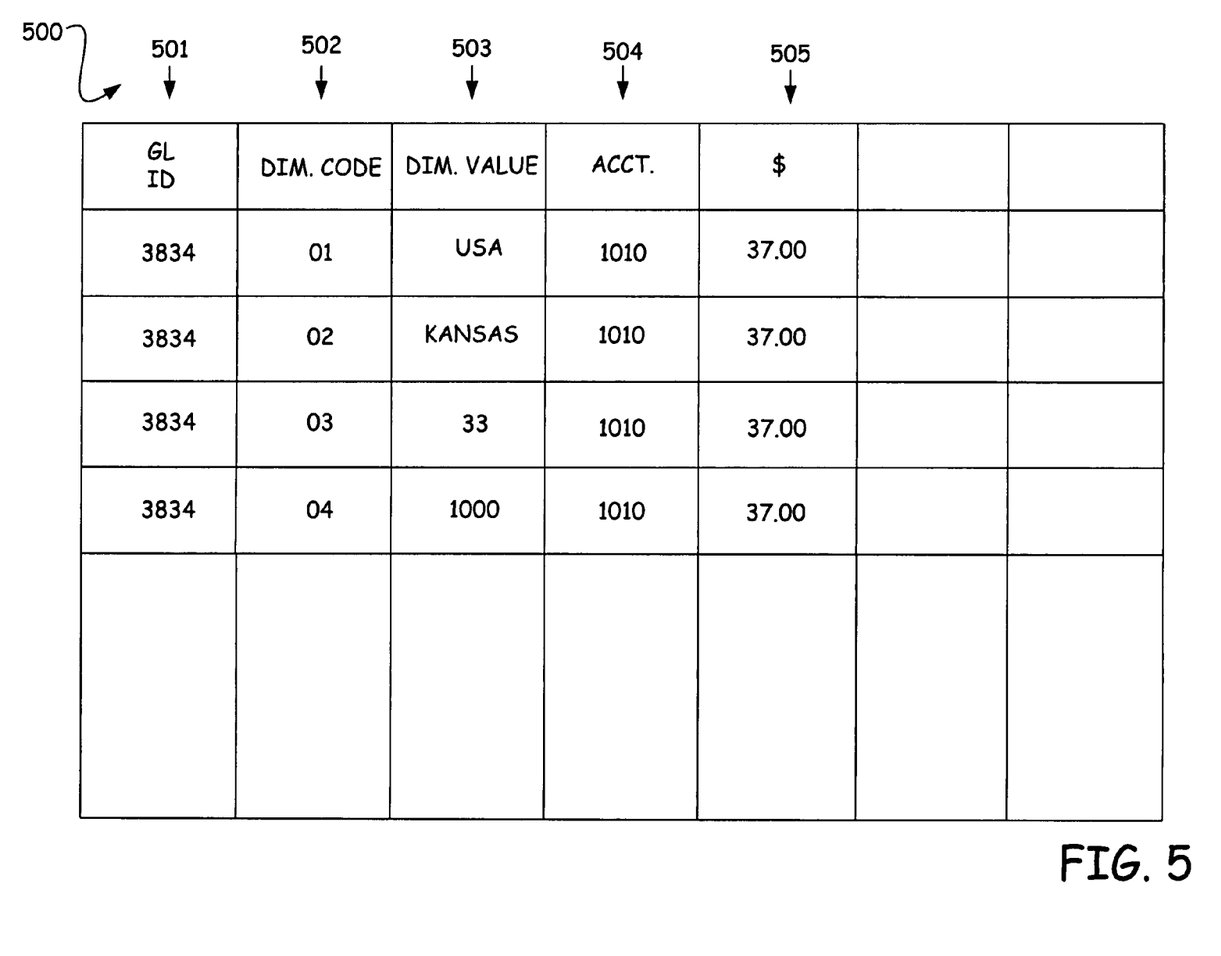
FIG. 5 is a representation of a transaction table.

FIG. 5, in accordance with one embodiment of the present invention, is a transaction table that contains data stored as a representation of a transaction. The tables of FIGS. 4 and 5 illustratively operate together in support of a specialized data definition scheme. A different row is illustratively added to table 500 for each dimension associated with a transaction. Column 501 contains an identifier (e.g., a journal entry number) for the associated general ledger transaction. Column 502 contains the dimension code for each relevant dimension. Column 503 contains the corresponding dimension value. Column 504 lists the relevant account number. Column 505 lists the amount of the transaction. For the purpose of distinguishing the present invention from what has been done in the past, the transaction represented in table 500 includes details that are essentially the same as the details associated with the transaction of table 300 in FIG. 3.

In accordance with the data definition scheme associated with FIGS. 4 and 5, if the user desires to add a dimension to the relational chart of accounts, a corresponding row is simply added to table 400, and subsequent transactions will include a corresponding row in table 500. If the user desires to eliminate a dimension from the relational chart of accounts, the corresponding row is simply eliminated from table 400, and subsequent transactions will not include a corresponding row in table 500. Similarly, inactive dimensions will not be included in table 500. Thus, changes can be made to the dimension scheme without any physical data storage changes.

In accordance with another aspect of the present invention, each of a plurality of companies within a single enterprise operates its own relational chart of accounts. For example, in one embodiment, an enterprise has a relational chart of accounts that incorporates ties to affiliated companies. Each affiliated company within the enterprise, however, operates their own chart of accounts without having to keep track of the enterprise. Thus, the enterprise and affiliated company utilize a different chart of accounts. In one embodiment, each has control to manipulate dimension configurations as desired. In one embodiment, rules can be enforced to prevent such dimension configurations from being manipulated (e.g., the enterprise can restrict certain companies from manipulating certain dimension configurations).

Although the present invention has been described with reference to preferred embodiments, workers skilled in the art will recognize that changes may be made in form and detail without departing from the spirit and scope of the invention.

What is claimed is:

1. A computer readable storage media having instructions embedded thereon that, when executed, cause a computer to provide a relational chart of accounts with an underlying data support scheme that allows for an undetermined number of dimensions to be utilized within the relational chart of accounts relative to a given account, wherein the relational chart of accounts includes a listing of accounts and dimensions that dictates which dimensions will be noted with transactions recorded within a general ledger, the relational chart of accounts and the general ledger being parts of the same accounting application, and wherein the underlying data support scheme includes a table of dimensions that is separate from the relational chart of accounts itself, the table of dimensions including a record of active dimensions in the relational chart of accounts, and wherein the instructions cause the computer to make at least one change to a collection of active dimensions without requiring a re-implementation of the chart of accounts, and wherein said at least one change to the collection of active dimensions includes eliminating an active dimension, the active dimension being eliminated by the computer by removing a corresponding row from the table of dimensions and then no longer noting the eliminated dimension in the relational chart of accounts or in subsequent transactions in the general ledger, and wherein said at least one change to the collection of active dimensions include adding an active dimension from a set of active dimensions, the active dimension being added by the computer by adding a corresponding row to the table of dimensions and then noting the active dimensions in the relational chart of accounts and in subsequent transactions in the general ledger, and wherein the instructions further cause the computer to process, based at least in part on the active dimension, data associated with historical transactions that preceded said eliminating the active dimension, and wherein eliminating an active dimension comprises eliminating without deleting a column from a database table, and wherein the general ledger contains a record of a financial transaction, the record including a data upon which the financial transaction occurred and an account to which the transaction is to be applied.

2. The computer readable storage media of claim 1, wherein the instructions further enable a computer to process data based at least in part on a dimension that has been eliminated from a set of active dimensions.

3. The computer readable storage media of claim 1, wherein the instructions further enable a computer to persist a plurality of different dimension combinations based on the dimensions used.

4. The computer readable storage media of claim 1, wherein the instructions further enable a computer to persist a plurality of different dimension combinations based on a factor other than the number of dimensions defined.

5. The computer readable storage media of claim 1, wherein the instructions further enable a computer to create a new dimension that applies only to subsequent transactions.

6. A computer-implemented accounting system comprising a data definition represented within instructions embedded on a computer readable storage media and configured to support a relational chart of accounts, wherein the data definition allows for an undetermined number of dimensions to be utilized within the relational chart of accounts relative to an account, and wherein the data definition enables different account/dimension combinations to be persisted based on a factor other than a number of dimensions defined, and wherein the relational chart of accounts includes a listing of accounts associated with a general ledger, the relational chart of accounts and the general ledger being parts of the same accounting application, wherein the data definition enables different account/dimension combinations to be persisted based on dimensions used, and wherein change to be made to a collection of active dimensions without requiring a re-implementation of the relational chart of accounts, wherein the data definition allows said change in the form of an active dimension being eliminated, wherein the data definition allows said change in the form of an active dimension being added, and wherein the data definition allows, and wherein the system allows processing, based at least in part on a particular active dimension included in the collection of active dimensions, of data associated with historical transactions that preceded an elimination of the particular active dimension, and wherein eliminating the particular active dimension comprises eliminating without deleting a column from a database table, and wherein the general ledger contains a record of a financial transaction, the record including a date upon which the financial transaction occurred and an account to which the transaction is to be applied said change in the form of an active dimension being inactivated.

7. The computer-readable storage media of claim 1, wherein the instructions cause a computer processor that is a functional component of the computer to provide an indication, within the general ledger, that a particular transaction recorded in the general ledger against a particular account is affiliated with a particular active dimension, the particular active dimension being listed within the table dimensions as being an active dimension in the relational chart of accounts.

8. The computer-readable storage media of claim 1, wherein the instructions cause a computer processor that is a functional component of the computer to provide an indication, within the general ledger, that a particular transaction recorded in the general ledger against a particular account is affiliated with a particular active dimension, the particular active dimension being listed within the table dimensions as being active relative to the particular account.

9. The computer-readable storage media of claim 1, wherein the general ledger includes an entry of a particular financial transaction against a particular account, and wherein said listing of accounts in the relational chart of accounts includes an indication of the particular account along with an associated particular dimension, and wherein the associated particular dimension is noted within the general ledger as part of the entry of the particular financial transaction.

10. The computer-readable storage media of claim 1, wherein the instructions cause a computer processor that is a functional component of the computer to provide a sub-leger that includes an entry of a particular financial transaction, wherein the particular financial transaction is also posted to the general ledger such that the general ledger also includes an entry indicative of the particular financial transaction.

11. The computer-readable storage media of claim 1, wherein the table of dimensions includes a general ledger journal entry number that corresponds a transaction recorded in the general ledger.

12. The system of claim 6, wherein the table of dimensions includes a general ledger journal entry number that corresponds a transaction recorded in the general ledger.

13. The system of claim 6, wherein the general ledger contains an record of a financial transaction, the record including a date upon which the financial transaction occurred and an account to which the transaction is to be applied.

14. The system of claim 6, wherein the data definition is utilized by a computer processor that is a functional component of a computer to make changes to the collection of active dimensions without re-implementing the relational chart of accounts.

\* \* \* \* \*